US009633460B2

(12) United States Patent
Hung et al.

(10) Patent No.: US 9,633,460 B2
(45) Date of Patent: Apr. 25, 2017

(54) SYSTEMS AND METHODS FOR SEAMLESS PATCH MATCHING

(71) Applicant: Cyberlink Corp., Shindian, Taipei (TW)

(72) Inventors: Hao-Ping Hung, New Taipei (TW); Pei-Ying Lu, Changhua County (TW)

(73) Assignee: CYBERLINK CORP., Shindian, Taipei (TW)

( * ) Notice: Subject to any disclaimer, the term of this patent is extended or adjusted under 35 U.S.C. 154(b) by 161 days.

(21) Appl. No.: 14/138,179

(22) Filed: Dec. 23, 2013

(65) Prior Publication Data

US 2014/0270535 A1    Sep. 18, 2014

Related U.S. Application Data

(60) Provisional application No. 61/788,609, filed on Mar. 15, 2013.

(51) Int. Cl.
| G06K 9/46 | (2006.01) |
| G06T 11/60 | (2006.01) |
| G06T 5/00 | (2006.01) |

(52) U.S. Cl.
CPC .............. G06T 11/60 (2013.01); G06T 5/002 (2013.01); G06T 5/003 (2013.01); *G06T 2207/20221* (2013.01)

(58) Field of Classification Search
None
See application file for complete search history.

(56) References Cited

U.S. PATENT DOCUMENTS

| 6,075,905 | A | * | 6/2000 | Herman | G06K 9/32 |
| | | | | | 348/588 |
| 6,724,946 | B1 | * | 4/2004 | Kusama | G06K 9/32 |
| | | | | | 348/218.1 |
| 7,103,231 | B2 | | 9/2006 | Cornog et al. | |
| 7,139,022 | B1 | * | 11/2006 | Raffy | H04N 9/045 |
| | | | | | 345/604 |
| 7,839,422 | B2 | | 11/2010 | Agarwala | |
| 8,019,177 | B2 | | 9/2011 | Rother et al. | |
| 8,073,243 | B2 | | 12/2011 | Mareachen et al. | |

(Continued)

OTHER PUBLICATIONS

Mortensen, Eric N., and William A. Barrett. "Intelligent scissors for image composition." Proceedings of the 22nd annual conference on Computer graphics and interactive techniques. ACM, 1995. 8 pages.*

(Continued)

*Primary Examiner* — Sumati Lefkowitz
*Assistant Examiner* — Ryan P Potts
(74) *Attorney, Agent, or Firm* — McClure, Qualey & Rodack, LLP

(57) ABSTRACT

A method implemented in an image editing device comprises determining a source region in a source image and determining a target region in a target image. At least one image characteristic of each of the source region and a region outside the target region is analyzed. The content in the source region is adjusted according to the at least one image characteristic of the source region and the at least one image characteristic of the region outside the target region. The adjusted content from the source region is inserted into the target region.

19 Claims, 12 Drawing Sheets

(56) References Cited

U.S. PATENT DOCUMENTS

| | | | |
|---|---|---|---|
| 2003/0197712 A1* | 10/2003 | Dantwala | G06T 5/20 345/617 |
| 2007/0013813 A1 | 1/2007 | Sun et al. | |
| 2008/0198175 A1 | 8/2008 | Sun et al. | |
| 2009/0129700 A1* | 5/2009 | Rother | G06T 11/00 382/284 |
| 2011/0200259 A1 | 8/2011 | Lindskog et al. | |
| 2013/0076941 A1* | 3/2013 | Palanciuc | H04N 5/23232 348/231.99 |

OTHER PUBLICATIONS

Ferrari, Stefano. "Sharpening through spatial filtering." Universita degli Studi di Milano. Dec. 8, 2011. 12 pages.*

Farbman, Zeev, et al. "Coordinates for instant image cloning." ACM Transactions on Graphics (TOG). vol. 28. No. 3. ACM, 2009. 11 pages.*

Xie, Zhi-Feng, et al. "Seamless video composition using optimized mean-value cloning." The Visual Computer 26.6-8 (2010): 1123-1134. 12 pages.*

Zhang et al. "Environment-Sensitive Cloning in Images"; Apr. 22, 2011.

Xiong et al.; Mobi Case '09: Proceedings of the First Annual International Conference on Mobile Computing, Applications, and Services; "Gradient Domain Image Blending and Implementation on Mobile Devices" 2009.

Xiong et al.; IEEE Workshop on Mobile Vision, in Conjunction with CVPR '2010 (IWMV2010); "Fast Image Stitching and Editing for Panorama Painting on Mobile Phones" 2010.

Ding et al., "Content-Aware Copying and Pasting in Images"; Apr. 8, 2010.

Sunkavalli et al.; SIGGRAPH; "Multi-scale Image Harmonization" 2010.

* cited by examiner

SYSTEMS AND METHODS FOR SEAMLESS PATCH MATCHING

CROSS-REFERENCE TO RELATED APPLICATION

This application claims priority to, and the benefit of, U.S. Provisional Patent Application entitled, "Systems and Methods for Seamless Cloning Image Patch," having Ser. No. 61/788,609, filed on Mar. 15, 2013, which is incorporated by reference in its entirety.

BACKGROUND

In the photo editing domain, it is highly desirable for a user to be able to select an object from a source image and then place the object in a specific location or region of the target image. In many circumstances, there are significant differences between the source patch and the target image with regards to lighting intensity, color, gradient level, noise level, and so on. These differences can affect the editing process, thereby making the processed image unsatisfactory to the user. In recent years, the Poisson Image Editing technique and Mean Value Clone technique has been used to resolve the discrepancy in lighting intensity and color level. However, for two images with different noise levels or gradient levels, the user can generally still distinguish the source patch from the target image even where the boundary between the source patch and the target image is relatively smooth.

SUMMARY

Briefly described, one embodiment, among others, is a method implemented in an image editing device that comprises determining a source region in a source image and determining a target region in a target image. The method further comprises analyzing at least one image characteristic of each of the source region and a region outside the target region and adjusting content in the source region according to the at least one image characteristic of the source region and the at least one image characteristic of the region outside the target region. The adjusted content from the source region is inserted into the target region.

Another embodiment is an image editing system that comprises a processor and at least one application executable in the processor. The at least one application comprises a user interface generator configured to display a user interface and obtain a source region in a source image, the user interface generator being further configured to obtain a target region in a target image. The at least one application further comprises a content analyzer configured to analyze at least one image characteristic of each of the source region and a region outside the target region, a content modifier configured to adjust content in the source region according to the at least one image characteristic of the source region and the at least one image characteristic of the target region, and an image synthesizer configured to insert the adjusted content from the source region into the target region and apply a smoothing operation to a boundary of the target region.

Another embodiment is a non-transitory computer-readable medium embodying a program executable in a computing device that comprises code that determines a source region in a source image, code that determines a target region in a target image, and code that analyzes at least one image characteristic of each of the source region and a region outside the target region. The program further comprises code that adjusts content in the source region according to the at least one image characteristic of the source region and the at least one image characteristic of the target region, code that inserts the adjusted content from the source region into the target region, and code that applies a mean-value cloning to a boundary of the target region.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Various embodiments are disclosed for inserting content from a source image into a target image where the content from the source image and the target image have one or more different image characteristics, where the one or more image characteristics may comprise, for example, noise level and/or or gradient level. Based on one or more image characteristics associated with the target image, the noise level or gradient level of the content from the source image is adjusted or modified so that the content and the target image share compatible image characteristics such as similar noise levels or similar gradient levels. In this regard, an exemplary method for editing an image in accordance with various embodiments includes determining a source region in a source image and determining a target region in a target image. One or more image characteristics are analyzed for both the source region and a region outside the target region.

The content in the source region is adjusted according to the one or more image characteristics of both the source region and the region outside the target region. The adjusted content from the source region is then inserted into the target region, thereby providing a better quality result as the one or more image characteristics of both the content from the source region and the target image are compatible. A description of a system for facilitating image editing is now described followed by a discussion of the operation of the components within the system.

Figure 1:
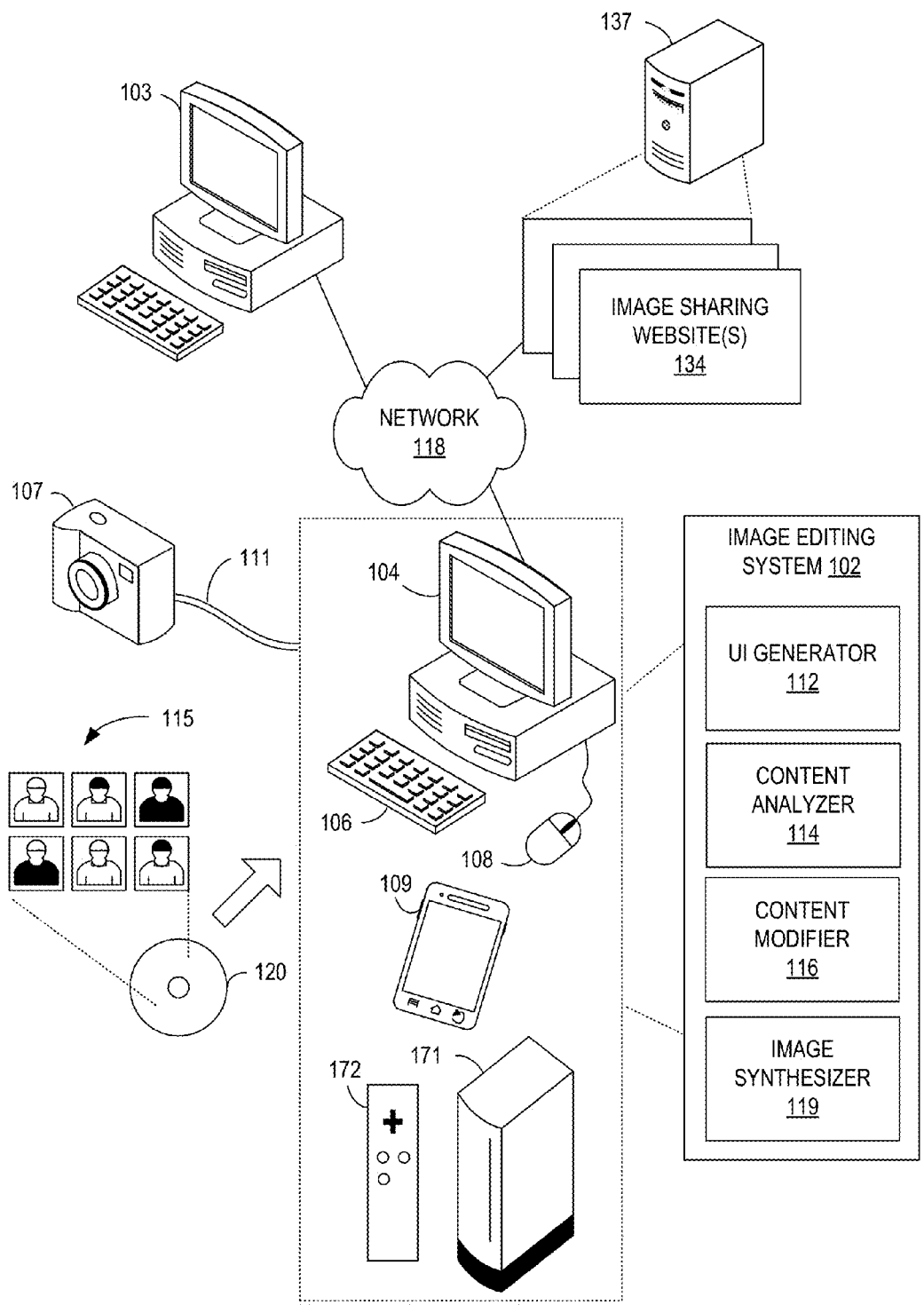
FIG. 1 is a block diagram of a networked environment in which embodiments of an image editing system may be implemented in accordance with various embodiments of the present disclosure.

FIG. 1 is a block diagram of an image editing system 102 in which embodiments of the image processing techniques disclosed herein may be implemented. The image editing system 102 may be embodied, for example, as a desktop computer, computer workstation, laptop, a smartphone 109, a tablet, or other computing platform and includes a display 104 and may include such input devices as a keyboard 106 and a mouse 108.

For embodiments where the image editing system 102 is embodied as a smartphone 109 or tablet, the user may interface with the image editing system 102 via a touchscreen interface (not shown). In other embodiments, the image editing system 102 may be embodied as a video gaming console 171, which includes an image game controller 172 for receiving user preferences. For such embodiments, the image gaming console 171 may be connected to a television (not shown) or other display.

The image editing system 102 is configured to retrieve digital media content 115 stored on a storage medium 120 such as, by way of example and without limitation, a compact disc (CD) or a universal serial bus (USB) flash drive, wherein the digital media content 115 may then be stored locally on a hard drive of the image editing system 102. As one of ordinary skill will appreciate, the digital media content 115 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats.

As depicted in FIG. 1, the image editing system 102 may also be configured to retrieve digital media content 115 directly from a digital recording device 107 where a cable 111 or some other interface may be used for coupling the digital recording device 107 to the image editing system 102. The image editing system 102 may support any one of a number of common computer interfaces, such as, but not limited to IEEE-1394 High Performance Serial Bus (Firewire), USB, a serial connection, and a parallel connection.

The digital recording device 107 may also be coupled to the image editing system 102 over a wireless connection or other communication path. The image editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the image editing system 102 may receive digital media content 115 from another computing system 103. Alternatively, the image editing system 102 may access one or more image sharing websites 134 hosted on a server 137 via the network 118 to retrieve digital media content 115.

Various applications and/or other functionality may be executed in the image editing system 102 according to various embodiments. The components executed on the image editing system 102 include, for example, a user interface generator 112, a content analyzer 114, a content modifier 116, an image synthesizer 119, and other applications, services, processes, systems, engines, or functionality not discussed in detail herein.

The user interface generator 112 is executed to display a user interface and to obtain a source region in a source image from a user. The user interface generator 112 also obtains a target region in a target image from the user, where the source region is to be inserted into the target region of the target image. The content analyzer 114 is executed to analyze one or more image characteristics of each of the source region and a region outside the target region, where the one or more image characteristics may include, for example, noise level, the gradient level, and other image characteristics.

The content modifier 116 is executed to adjust content in the source region according to the one or more image characteristics of the source region and the one or more image characteristics of the target region. Note that adjusting the content in the source region may include such operations as reducing noise in the source region, adding noise to the source region, performing smoothing operations on the source region, performing sharpening operations on the source region, and so on. The image synthesizer 119 is executed to insert the adjusted content in the source region into the target region. For some embodiments, the image synthesizer 119 is further configured to apply a smoothing operation to a boundary of the target region. In accordance with some embodiments, the smoothing operations may comprise such image editing techniques as Poisson image editing and mean value clone processing, where such techniques resolve the discrepancy in lighting intensity and color level to achieve a smoothing effect and the boundary between the source patch and the target background becomes insignificant.

Figure 2:
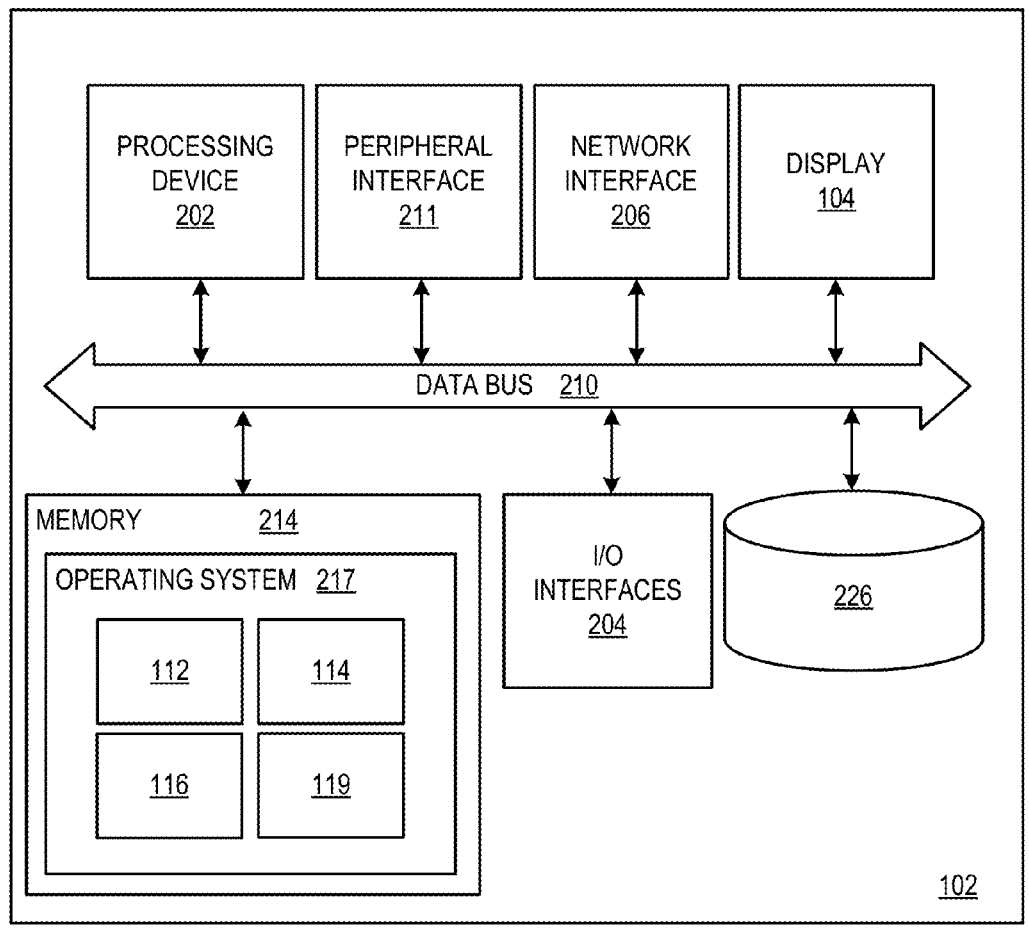
FIG. 2 is a detailed view of the image editing system of FIG. 1 in accordance with various embodiments of the present disclosure.

FIG. 2 is a schematic diagram of the image editing system 102 shown in FIG. 1. The image editing system 102 may be embodied in any one of a wide variety of wired and/or wireless computing devices, such as a desktop computer, portable computer, dedicated server computer, multiprocessor computing device, smartphone, tablet computing device, and so forth. As shown in FIG. 2, the image editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the image editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (user interface generator 112, content analyzer 114, content modifier 116, image synthesizer 119) of the image editing system 102 depicted in FIG. 2. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the image editing system 102 comprises a personal computer, these components may interface with one or more user input devices via the I/O interfaces 204, where the user input devices may comprise a keyboard 106 (FIG. 1) or a mouse 108 (FIG. 1). The display 104 may comprise a computer monitor, a plasma screen for a PC, a liquid crystal display (LCD), a touchscreen display, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The image editing system 102 may communicate with one or more computing devices via the network interface 206 over the network 118 (FIG. 1). The image editing system 102 may further comprise mass storage 226. The peripheral interface 211 supports various interfaces including, but not limited to IEEE-1294 High Performance Serial Bus (Firewire), USB, a serial connection, and a parallel connection.

Figure 3:
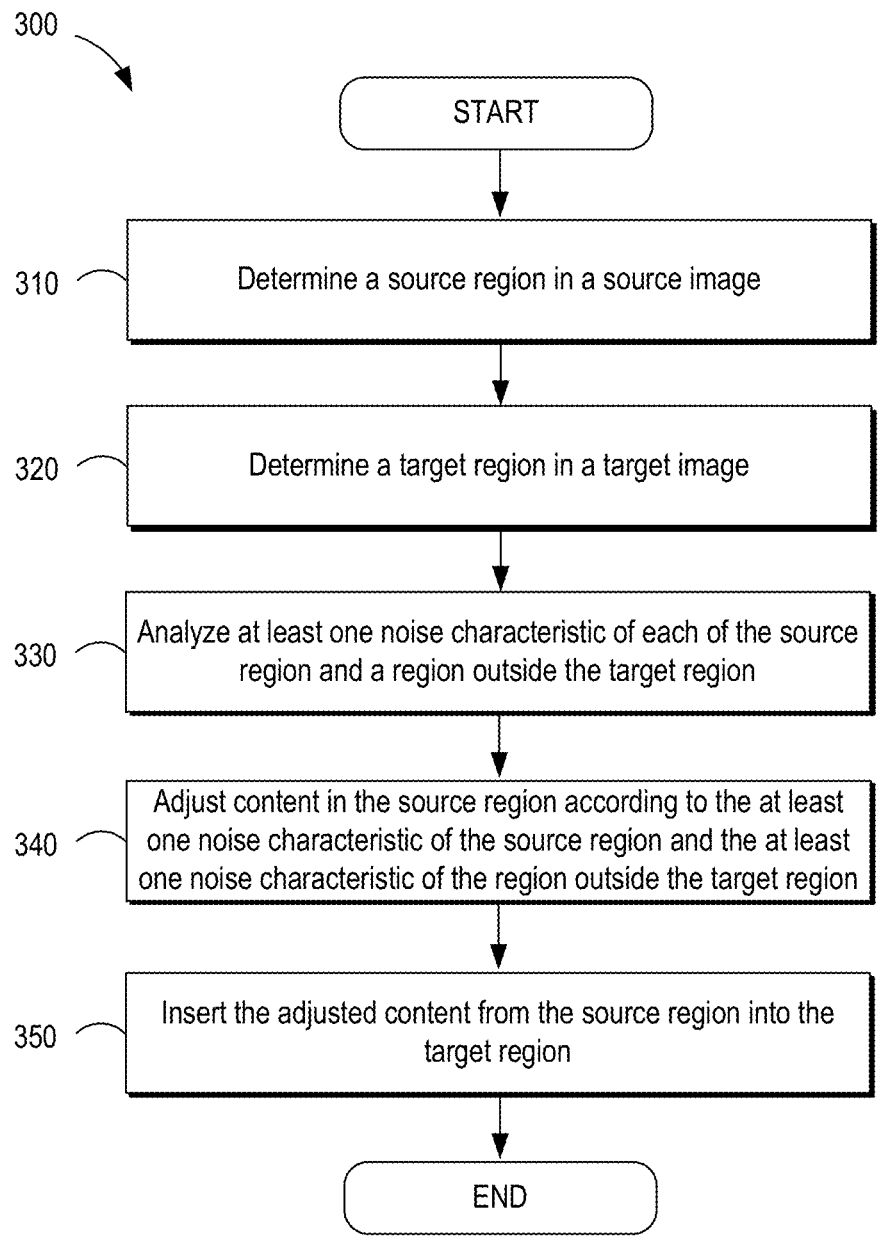
FIG. 3 is a top-level flowchart illustrating examples of functionality implemented as portions of the image editing system of FIG. 1 for facilitating image editing via content analysis according to various embodiments of the present disclosure.

Reference is made to FIG. 3, which is a flowchart 300 in accordance with one embodiment for facilitating insertion of content from a source region into a target image. It is understood that the flowchart 300 of FIG. 3 provides merely an example of the many different types of functional arrangements that may be employed to implement the operation of the various components of the image editing system 102 (FIG. 1). As an alternative, the flowchart of FIG. 3 may be viewed as depicting an example of steps of a method implemented in the image editing system 102 according to one or more embodiments.

Beginning with block 310, the image editing system 102 determines a source region in a source image. For some embodiments, the user interface generator 112 (FIG. 1) renders a user interface for display to a user, and in response, the user manually defines a boundary around the object of interest to produce the source region. In block 320, the image editing system 102 determines a target region in a target image. The target region corresponds to the location in the target image where the user inserts the specified source region.

In block 330, the content analyzer 114 (FIG. 1) analyzes at least one image characteristic of each of the source region and a region outside the target region to determine whether the at least one image characteristic of the source region and the at least image characteristic of the target region are compatible. In block 340, the content modifier 116 (FIG. 1) adjusts content in the source region according to the at least one image characteristic of the source region and the at least one image characteristic of the region outside the target region. In block 350, the image synthesizer 119 (FIG. 1) inserts the adjusted content from the source region into the target region to produce an edited result.

Figure 4A:
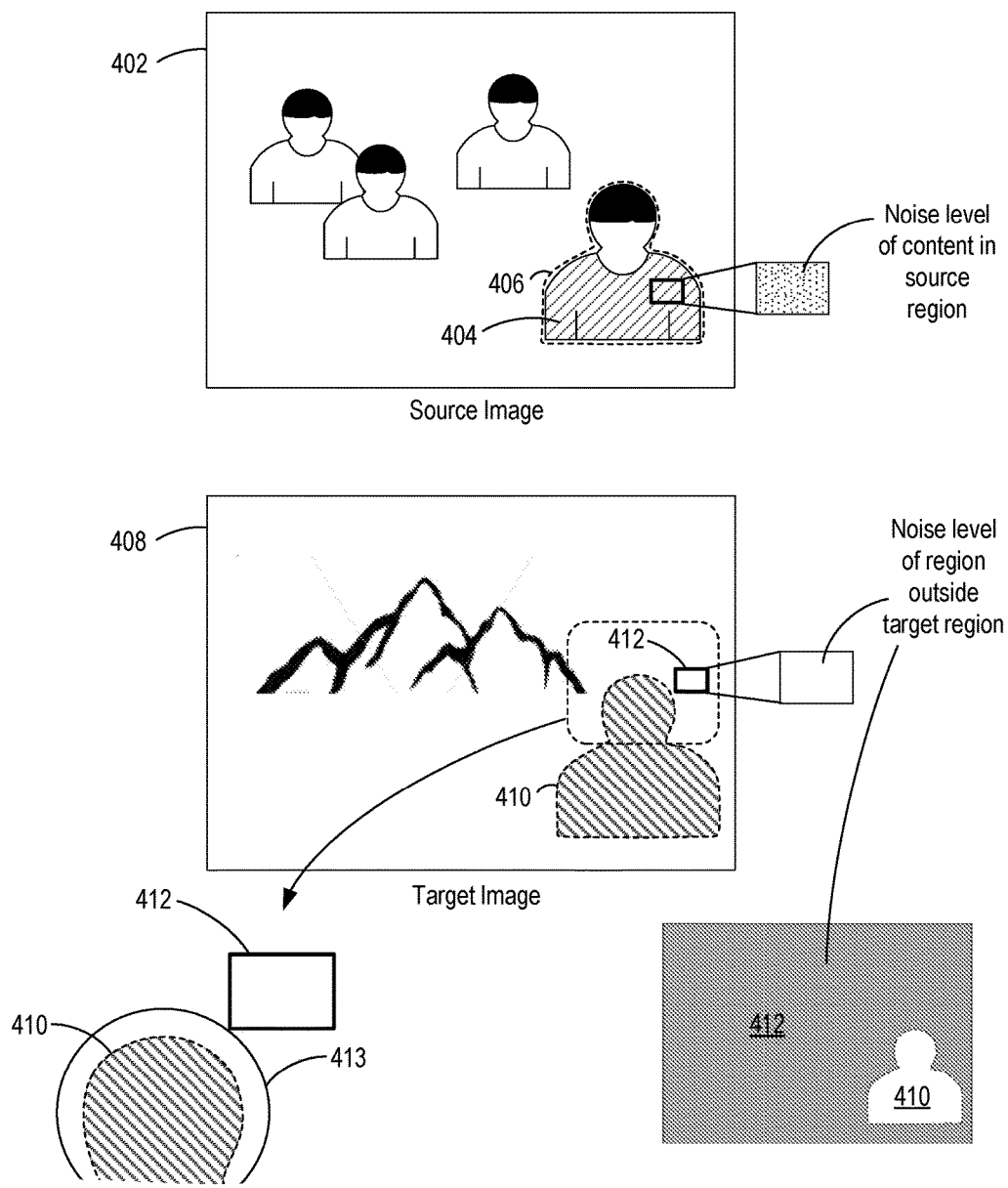
FIGS. 4A, 4B, 5A, and 5B illustrate image editing techniques based on noise level according to various embodiments of the present disclosure.
Figure 4B:
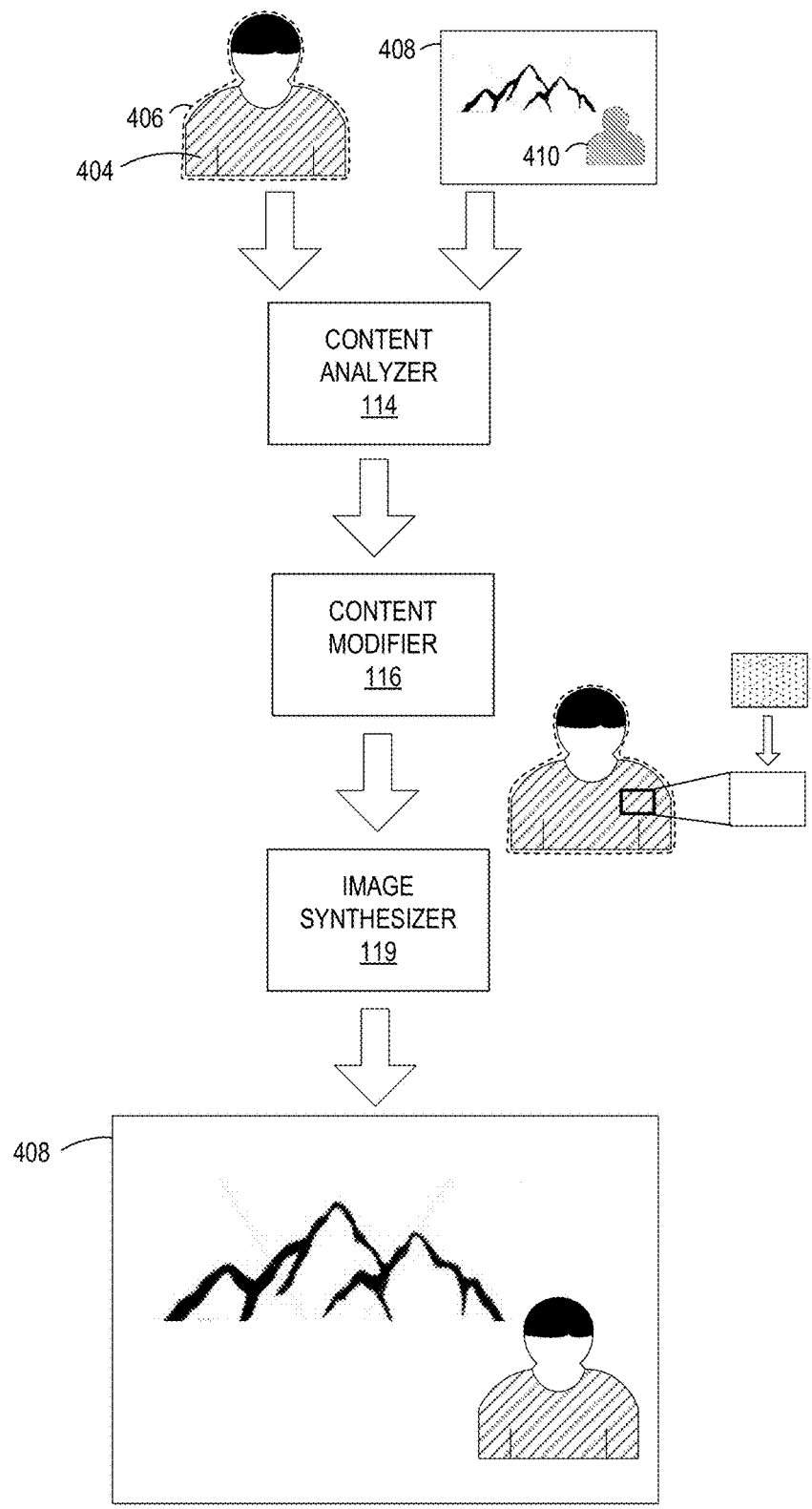

Reference is now made to FIGS. 4A and 4B, which further illustrate the image editing technique disclosed. Shown in the example of FIG. 4A is a source image 402 and a target image 408, where the source image 402 includes various objects (e.g., individuals). In the example shown, the user wishes to insert object 404 in the source image 402 into the target image 408 to generate an edited result. The user defines a boundary that surrounds the object 404 to be inserted into the target image 408 to produce the source region 406. For some implementations, the user manually draws a source region 406 around the object 404 using a mouse or other selection means such as a touchscreen interface. For some implementations, the user inserts the source region 406 into the target image 408 to define the target region 410.

With reference to FIG. 4B, the content within the source region 406 (e.g., object 404) is received by the content analyzer 114, and the content analyzer 114 analyzes one or more image characteristics of the source image content to be inserted into the target image 408. The content analyzer 114 analyzes the same one or more image characteristics of the target image 408. In particular, the content analyzer 114 analyzes the same one or more image characteristics of the region 412 outside the target region 410 to ensure that the content from the source region 406 blends with the region 412 outside the target region 410 once the content is inserted into the target region 410. Note that the content analyzer 114 will generally analyze image characteristics of a region 412 outside the target region 410 but in close proximity to the target region 410, such that the region 412 is located anywhere along an expanded boundary 413 defined around the target region 410. For some embodiments, the expanded boundary 413 is defined by a predefined number of pixels (e.g., 10 pixels) from the boundary defining the target region 410, as shown in FIG. 4A.

In the example shown in FIG. 4A, the content analyzer 114 analyzes the noise levels of both the content in the source region 406 and of the region 412 outside the target region 410. Assume, for purposes of illustration, that the noise level of the content within the source region 406 is greater than the noise level of the region 412 outside the target region 410. In response, the content modifier 116 adjusts the noise level of the content in the source region 406 such that the noise level substantially matches the noise level of the target image 408.

Referring to FIG. 4B, the content modifier 116 outputs the modified content to the image synthesizer 119, which inserts the modified content into the target image 408. For some embodiments, the image synthesizer 119 applies a mean-value cloning algorithm to the target region 410 where the source content has been inserted in order to achieve a smooth boundary between the inserted content and the remainder of the target image 408.

Figure 5A:
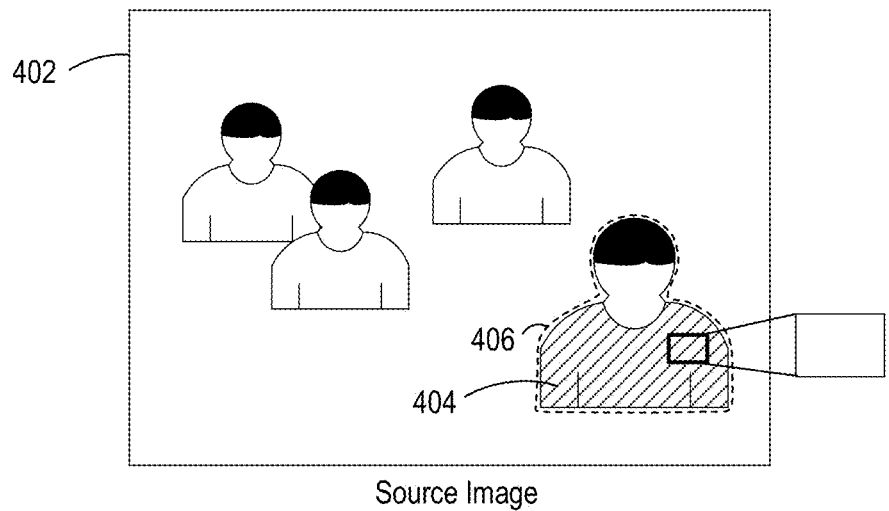
Figure 5A:
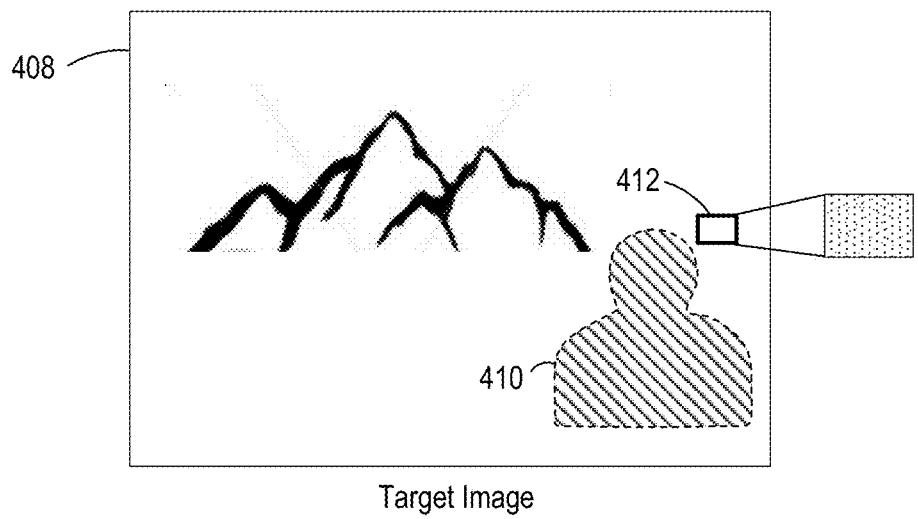
Figure 5B:
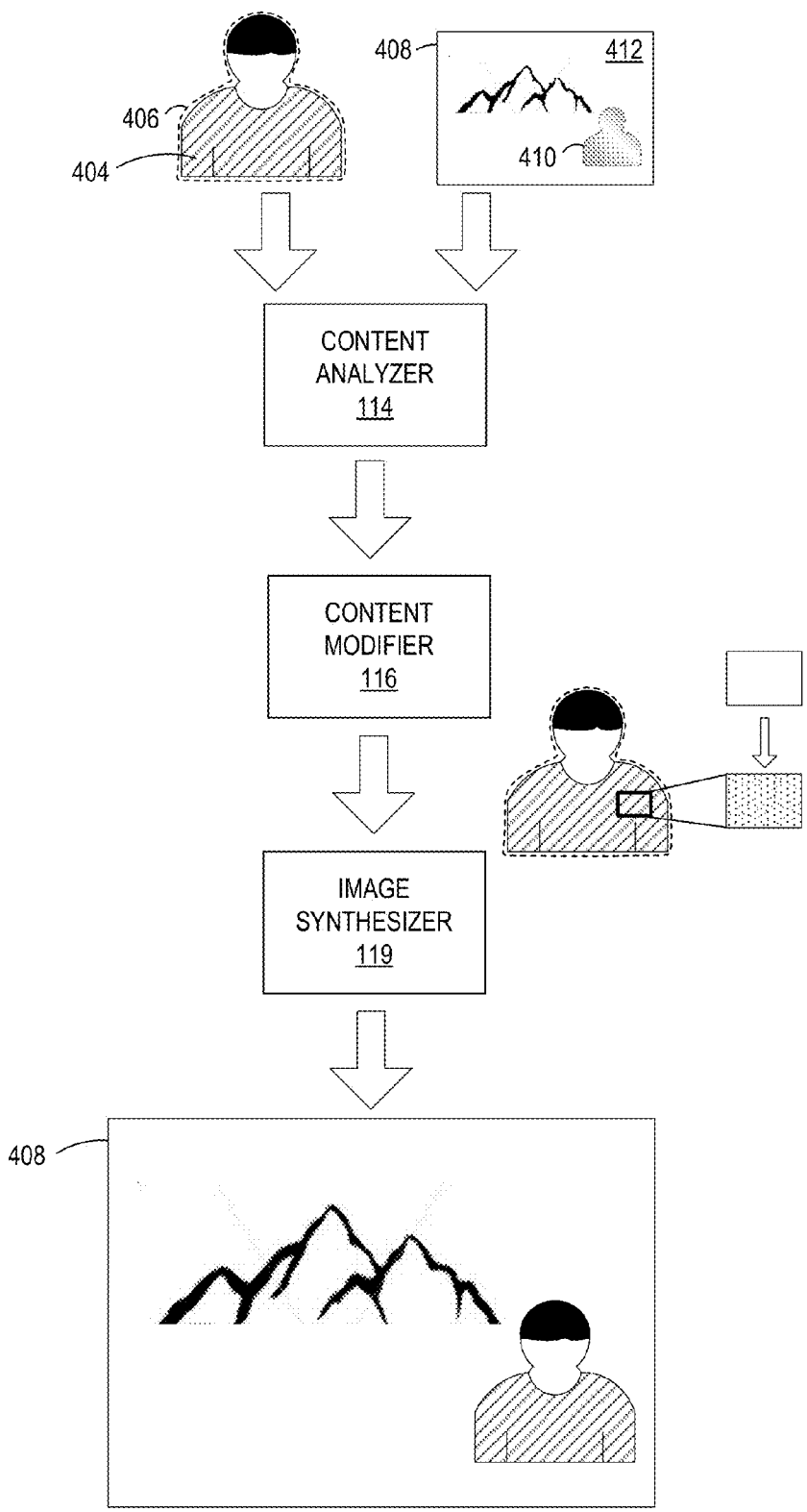

FIGS. 5A and 5B illustrate a scenario where the noise level of the content within the source region 406 is less than the noise level of the region 412 outside the target region 410 within the target image 408. As shown in FIG. 5B, the content modifier 116 injects noise into the content in the source region 406 so that the noise level substantially matches the noise level of the region 412 outside the target region 410. The image synthesizer 119 then inserts the modified content into the target image 408.

Figure 6A:
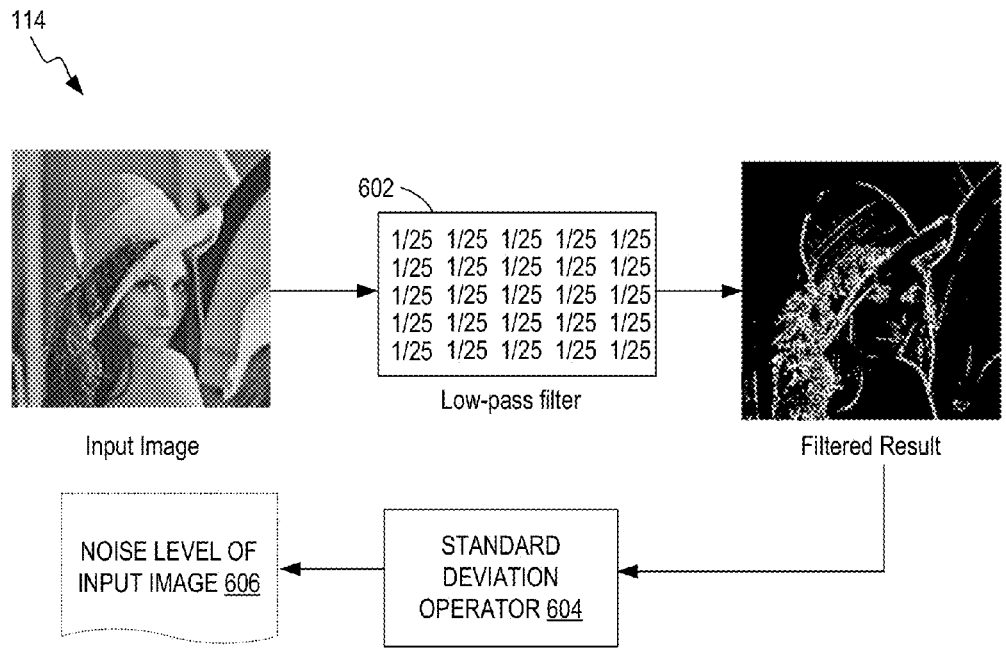
FIGS. 6A and 6B illustrate determination of image characteristics according to various embodiments of the present disclosure.
Figure 6B:
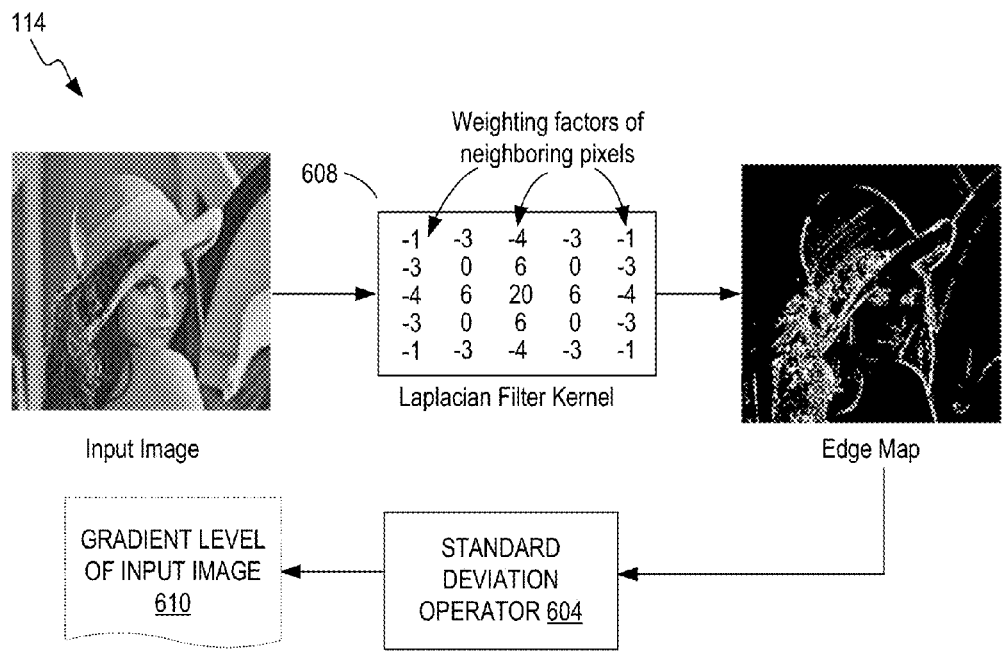

FIGS. 6A and 6B illustrate how image characteristics are derived in accordance with various embodiments. Specifically, FIG. 6A illustrates calculation of the noise level for an input image while FIG. 6B illustrates calculation of the gradient level. To determine the noise level of a given input image, a low-pass filter 602 (e.g., 5×5 filter) within the content analyzer 114 is applied to the input image, as illustrated in FIG. 6A. Each pixel within the pixel image is averaged by a predetermined number of neighboring pixels (e.g., 24 neighboring pixels), and the calculated average value replaces the original value of the pixel, thereby resulting in a smoothing effect. A standard deviation operation 604 in the content analyzer 114 determines the standard deviation of the filtered result, which represents the noise level 606 of the input image.

To determine the gradient level of a given input image, a Laplacian filter kernel 608 (e.g., 5×5 filter) within the content analyzer 114 is applied to the input image to obtain an edge map, as illustrated in FIG. 6B. The values in the Laplacian filter kernel shown represent weighting factors of neighboring pixels. The standard deviation operation 604 determines the standard deviation of the resulting edge map, where the standard deviation represents the gradient level of the input image.

Having described techniques for determining one or more image characteristics, various embodiments are now discussed for adjusting the content in the source region 406 based on the image characteristics. First, details are provided for adjusting the content in the source region 406 based on noise levels. Referring back to FIG. 4A, for situations where the noise level of the source region 406 is greater than the noise level of the target image 408, the content modifier 116 (FIG. 1) applies noise reduction until the noise level of the source region 406 substantially matches the noise level of the target image 408.

Figure 9:
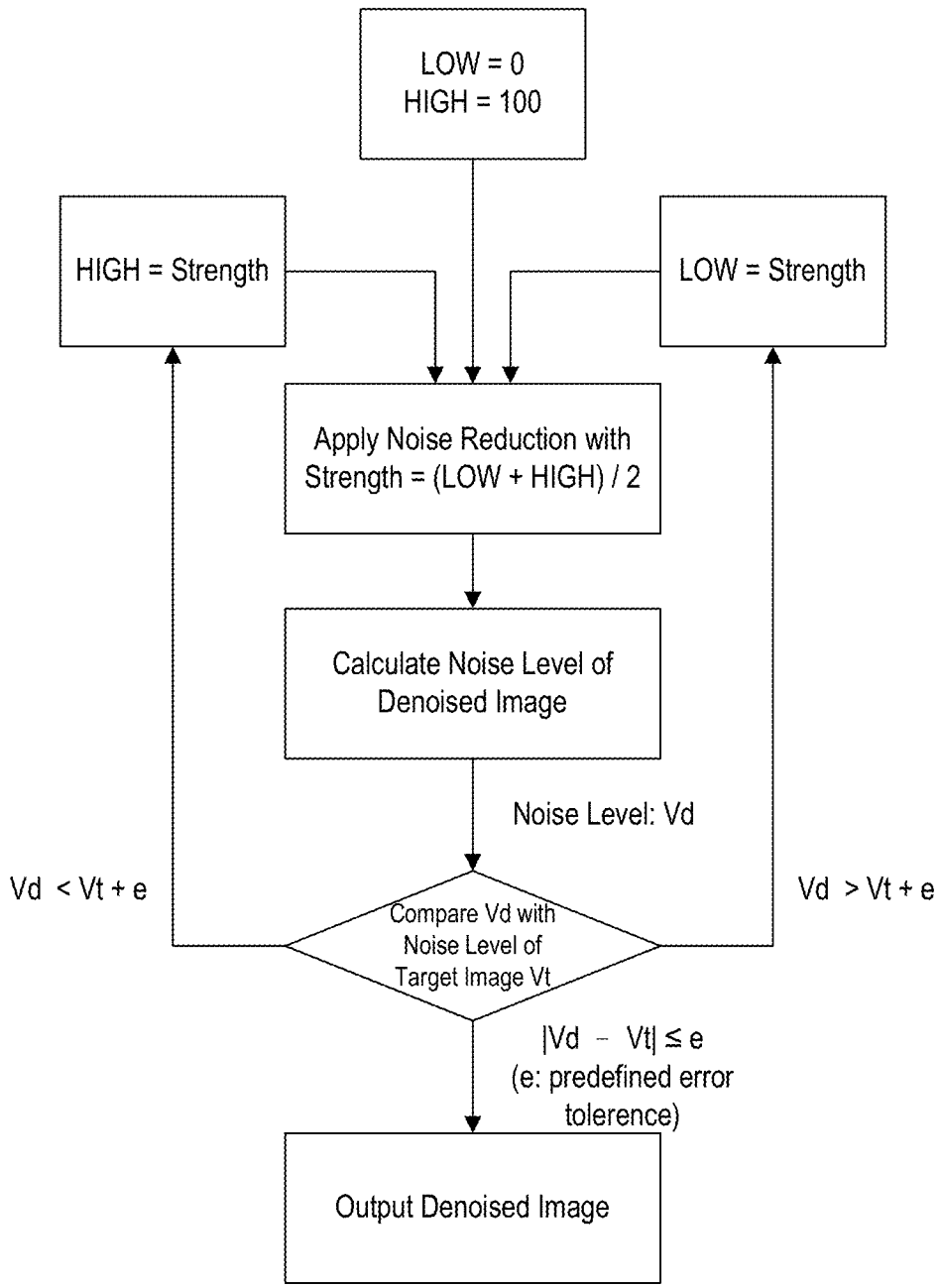
FIG. 9 illustrates a technique for generating a de-noised source image such that the noise level of the source image matches the noise level of the target image according to various embodiments of the present disclosure.

Reference is made to FIG. 9, which illustrates a technique in accordance with various embodiments for generating a de-noised source image such that the noise level of the source image matches the noise level of the target image. The de-noised source image is generated based on the assumption that a de-noised source image may be generated with a noise level lower than that of the target image. Assume that the highest strength measure of the image noise reduction method is 100 and that the lowest strength value of the image noise reduction method is 0, where the lowest strength value corresponds to the scenario where the original image is output without any noise reduction.

In the beginning, the noise reduction strength is set to a value of 50 and a de-noised image is generated. After that, the noise level of de-noised image is calculated. A comparison is made of the noise level between the de-noised image and the target image. If the noise level of de-noised image is similar to that of the target noise level (i.e., where the difference is within a predetermined error tolerance, e), then the de-noised image is output. Otherwise, the strength value of the noise reduction method is adjusted according to the result of the noise level comparison, and noise reduction is applied again at the adjusted strength value until the noise level is similar to that of the target image.

With reference back to 5A, for situations where the noise level of the target image 408 is greater than the noise level of the content in the source region 406, the content modifier 116 adds noise to the content of the source region 406 until the noise level substantially matches the noise level of the target image 408. In accordance with various embodiments, the content modifier 116 applies a low-pass filter to obtain a difference map D. A pseudo-randomizing operation is applied to the difference map D to rearrange the pixels in the difference map D to generate a permutated difference map R.

Figure 10:
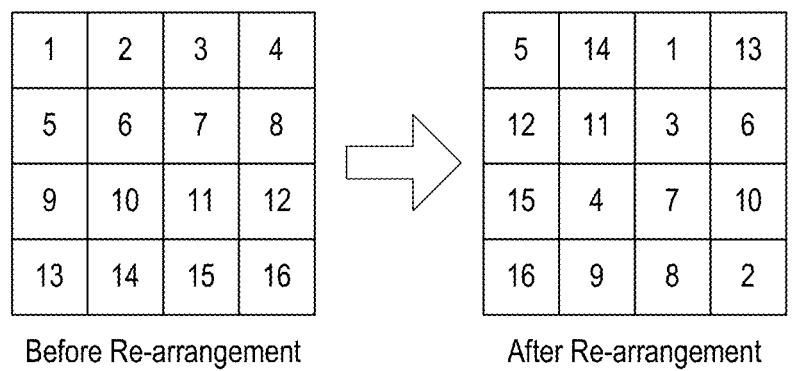
FIG. 10 illustrates an example of applying random permutation on difference map according to various embodiments of the present disclosure.

FIG. 10 illustrates an example of applying random permutation on difference map R. As shown, the pixels in the original 4×4 image are arranged in a specific order. After applying a randomizing operation, the pixels are scattered without any order. For some embodiments, the randomizing operation may comprise assigning a random number to each pixel; sorting the pixels according to the assigned random number in ascending order; and finally, re-arranging the sorted pixels from left to right and from top to bottom. The permutated difference map R is applied to the content of the source region 406 where the permutated difference map R is multiplied by a weighting factor w to obtain an output O, as set forth in the expression below:

$$O=S+w(R) \quad (1)$$

The output O represents an adjusted version of S (the content of the source region 406). If the noise level of output O is not substantially equal to the noise level of the target image 408, the weighting value w is iteratively adjusted until the noise levels substantially match.

Techniques for adjusting the content in the source region 406 based on gradient levels are now provided. For cases where the gradient level of the content in the source region 406 is larger than that of the target image 408, a smoothing operation is applied to the content in the source region 406 until the gradient level of the content in the source region 406 is substantially the same as that of the target image 408.

Figure 7:
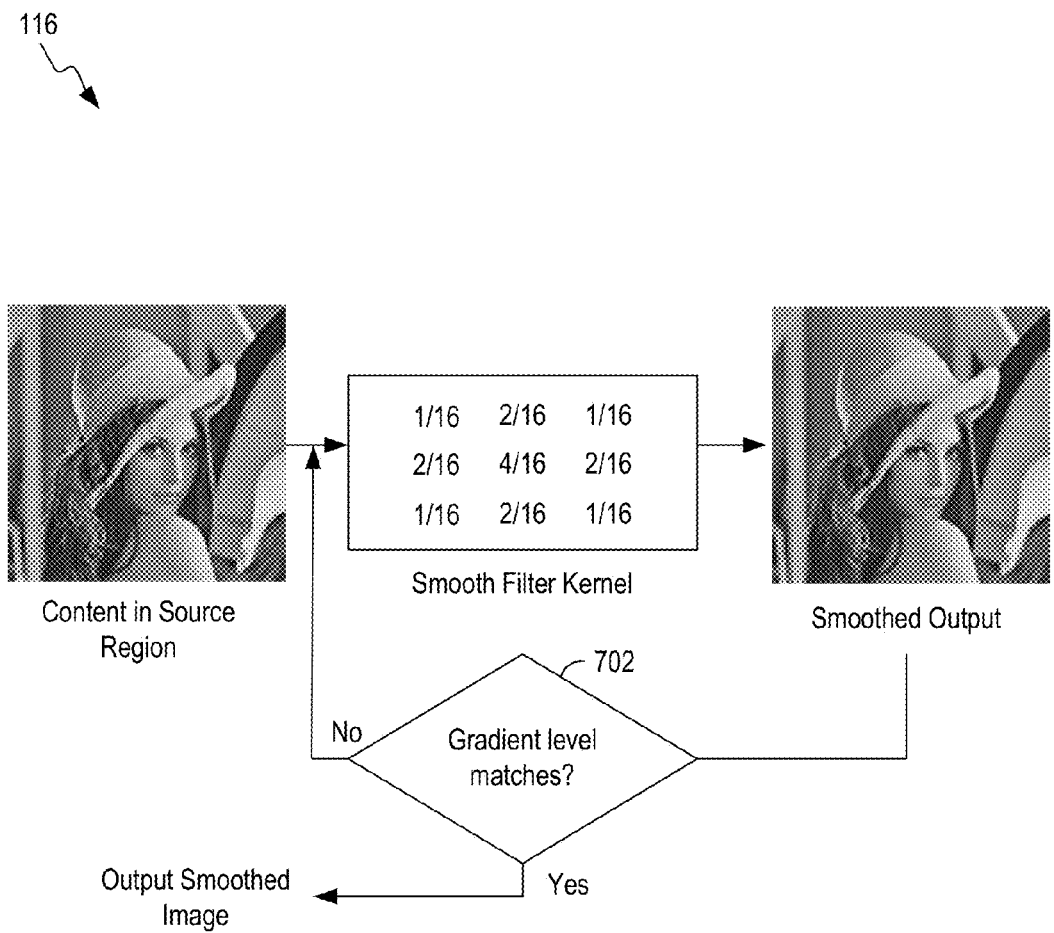
FIG. 7 illustrates a smoothing operation performed by the content modifier of the image editing system of FIG. 1 according to various embodiments of the present disclosure.

FIG. 7 illustrates the smoothing operation applied to the content in the source region 406. Within the content modifier 116, a smooth filter kernel is applied to the content in the source region 406 (FIG. 4A) to generate a smoothed output, where the smooth filter kernel may comprise, for example, a 5×5 low-pass filter. By applying the smooth filter kernel shown, each pixel is averaged by accumulating its neighboring pixel value according to the shown weighting factor. For example, for each pixel, the smoothed pixel value will be [(left_top)+(2*top)+(right_top)+(2*left)+(4*original_pixel_value)+(2*right)+(left_bottom)+(2*bottom)+(right_bottom)]/16, where "left_top" refers to the pixel value located at the left-top neighbor of the pixel, and so on. The content modifier 116 analyzes the gradient level of the smoothed output and determines whether the gradient level substantially matches the gradient level of the target image 408 (FIG. 4A).

At decision block 702, if the gradient levels substantially matches, then the content modifier 116 forwards the smoothed output (i.e., the adjusted content in the source region 406) to the image synthesizer 119 (FIG. 1), which inserts the content into the target region 410. As can be seen in FIG. 7, if the gradient levels do not substantially match, the content modifier 116 iteratively applies the smooth filter kernel to the smoothed output until the gradient levels substantially match.

For cases where the gradient level of the content in the source region 406 is less than that of the target image 408, a sharpening operation is applied to the content in the source region 406 until the gradient level of the content in the source region 406 is the substantially the same as that of the target image 408.

Figure 8:
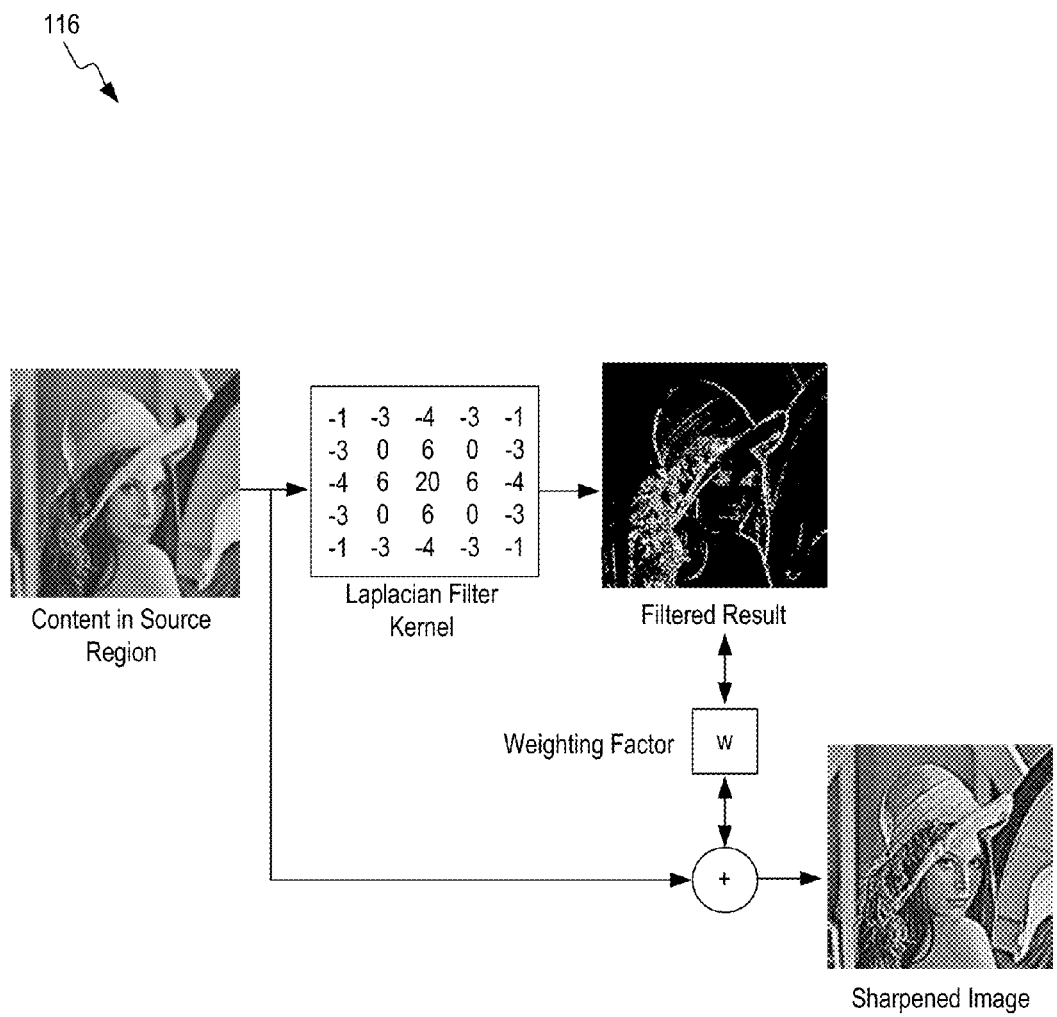
FIG. 8 illustrates a sharpening operation performed by the content modifier of the image editing system of FIG. 1 according to various embodiments of the present disclosure.

FIG. 8 illustrates the sharpening operation applied to the content in the source region 406 (FIG. 4A). The content modifier 116 applies a Laplacian filter kernel to the content in the source region 406 to produce a filtered result. The filtered result is multiple by a weighting factor w and added to the content in the source region 406 to produce a sharpened result. If the gradient level of the sharpened result does not substantially match the gradient level of the target image, the content modifier 116 iteratively adjusts the weighting factor w under the gradient levels substantially match.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in an image editing device for editing an image, comprising:
   determining a source region in a source image;
   determining a target region in a target image;
   analyzing at least one image characteristic of each of the source region and a region outside the target region, wherein the at least one image characteristic comprises a gradient level, wherein analyzing the gradient level comprises:
   for each of the source region and the region outside the target region,
   applying a high pass filter to the region to generate an edge map; and
   calculating a standard deviation for each pixel in the edge map, wherein the standard deviation value for all the pixels corresponds to the gradient level of the region;
   adjusting content within the source region according to the at least one image characteristic of the content within the source region and the at least one image characteristic of the region outside the target region;
   inserting the adjusted content from the source region into the target region; and
   upon insertion of the adjusted source region, applying a smoothing operation to a boundary of the adjusted source region, wherein the smoothing operation comprises averaging each pixel on the boundary by accumulating a pixel value of each neighboring pixel directly adjacent to the pixel being averaged according to a corresponding weighting factor.

2. The method of claim 1, wherein the at least one image characteristic comprises a noise level, and analyzing the noise level comprises:
   for each of the source region and the region outside the target region,
   applying a low pass filter to the region to generate a smooth region;
   determining a difference map based on a difference between the region and the smooth region; and
   calculating a standard deviation value for each pixel in the difference map, wherein the standard deviation value for all the pixels corresponds to the noise level of the region.

3. The method of claim 2, further comprising:
   in response to a noise level of the source region being greater than a noise level of the region outside the target region, applying noise reduction to the source region such that the noise level of the source region is equal to the noise level of the region outside the target region.

4. The method of claim 1, further comprising:
   in response to a noise level of the source region being less than a noise level of the region outside the target region, adding noise to the source region such that the noise level of the source region is equal to the noise level of the region outside the target region.

5. The method of claim 4, wherein adding noise to the source region comprises:
   applying a low pass filter to the source region to generate a smooth source region;
   determining a difference map based on a difference between the source region and the smooth source region;
   applying a permutation operation to the difference map;
   applying a weighting factor to the permutated difference map;
   adding the permutated difference map to the source region to generate a modified source region; and
   adjusting the weighting factor such that a noise level of the modified source region is equal to the noise level of the region outside the target region.

6. The method of claim 1, wherein the high pass filter is a Laplacian filter.

7. The method of claim 1, further comprising:
   in response to a gradient level of the source region being greater than a gradient level of the region outside the target region, applying a smoothing operation to the source region.

8. The method of claim 7, wherein applying the smoothing operation comprises iteratively applying a smooth filter kernel to the source region until the gradient level of the source region is equal to the gradient level of the region outside the target region.

9. The method of claim 1, further comprising:
   in response to a gradient level of the source region being less than a gradient level of the region outside the target region, applying a sharpening operation to the source region.

10. The method of claim 9, wherein applying the sharpening operation comprises:
    (a) applying a second high pass filter to the source region to generate a filtered result;
    (b) multiplying the filtered result by a weighting factor to generate a weighted output;
    (c) adding the weighted output to the source region to generate a sharpened image; and
    adjusting the weighting factor and repeating steps (a)-(c) until a gradient level of the sharpened image is equal to a gradient level of the region outside the target region.

11. The method of claim 10, wherein the second high pass filter is a Laplacian filter.

12. An image editing system, comprising:
a processor; and
at least one application executable in the processor, the at least one application, when executed by the processor, causes the processor to at least:
display a user interface and obtain a source region in a source image;
obtain a target region in a target image;
analyze at least one image characteristic of each of the source region and a region outside the target region, wherein the at least one image characteristic comprises a gradient level, wherein analyzing the gradient level comprises:
for each of the source region and the region outside the target region,
applying a high pass filter to the region to generate an edge map; and
calculating a standard deviation for each pixel in the edge map, wherein the standard deviation value for all the pixels corresponds to the gradient level of the region;
adjust content in the source region according to the at least one image characteristic of the source region and the at least one image characteristic of the target region; and
insert the adjusted content from the source region into the target region and apply a smoothing operation to a boundary of the target region, wherein the smoothing operation comprises averaging each pixel by accumulating a pixel value of each neighboring pixel directly adjacent to the pixel being averaged according to a corresponding weighting factor.

13. The system of claim 12, wherein the at least one application further causes the processor to apply noise reduction to the source region such that a noise level of the source region is equal to a noise level of the region outside the target region in response to the noise level of the source region being greater than the noise level of the region outside the target region,
wherein the processor is further configured to add noise to the source region such that the noise level of the source region is equal to the noise level of the region outside the target region in response to the noise level of the source region being less than the noise level of the region outside the target region.

14. The system of claim 13, wherein the at least one application further causes the processor to add noise to the source region by:
applying a low pass filter to the source region to generate a smooth source region;
determining a difference map based on a difference between the source region and the smooth source region;
applying a permutation operation to the difference map;
applying a weighting factor to the permutated difference map;
adding the permutated difference map to the source region to generate a modified source region; and
adjusting the weighting factor such that a noise level of the modified source region is equal to the noise level of the region outside the target region.

15. The system of claim 13, wherein the processor adds noise to the source region by:
(a) applying a high pass filter to the source region to generate a filtered result;
(b) multiplying the filtered result by a weighting factor to generate a weighted output;
(c) adding the weighted output to the source region to generate a sharpened image; and
adjusting the weighting factor and repeating steps (a)-(c) until a gradient level of the sharpened image is equal to a gradient level of the region outside the target region.

16. The system of claim 15, wherein the high pass filter is a Laplacian filter.

17. The system of claim 12, wherein the at least one application further causes the processor to apply the smoothing operation to the source region in response to a gradient level of the source region being greater than a gradient level of the region outside the target region,
wherein the processor is further configured to apply a sharpening operation to the source region in response to a gradient level of the source region being less than a gradient level of the region outside the target region.

18. A non-transitory computer-readable medium embodying a program executable in a computing device, comprising:
code that determines a source region in a source image;
code that determines a target region in a target image;
code that analyzes at least one image characteristic of each of the source region and a region outside the target region, wherein the at least one image characteristic comprises a gradient level, wherein analyzing the gradient level comprises:
for each of the source region and the region outside the target region,
applying a high pass filter to the region to generate an edge map; and
calculating a standard deviation for each pixel in the edge map, wherein the standard deviation value for all the pixels corresponds to the gradient level of the region;
code that adjusts content in the source region according to the at least one image characteristic of the source region and the at least one image characteristic of the target region;
code that inserts the adjusted content from the source region into the target region;
code that applies a mean-value cloning to a boundary of the target region; and code that applies a smoothing operation to a boundary of the source region, wherein the smoothing operation comprises averaging each pixel by accumulating a pixel value of each neighboring pixel directly adjacent to the pixel being averaged according to a corresponding weighting factor.

19. The non-transitory computer-readable medium of claim 18, wherein adjusting comprises adjusting at least one of a noise level and a gradient level.

* * * * *